US006858261B1

(12) United States Patent
Bär et al.

(10) Patent No.: US 6,858,261 B1
(45) Date of Patent: Feb. 22, 2005

(54) COATING AND DRYING OF OBJECTS BY WAY OF INFRARED RADIATION

(75) Inventors: Kai K. O. Bär, Bruckmühl (DE); Rainer Gaus, Bruckmühl (DE); Martin Sedlmeyr, Haar (DE); Stefan Schiele, Niederzissen (DE)

(73) Assignees: Advanced Photonics Technologies AG, Bruckmuhl-Heufeld (DE); Josef Schiele oHG, Niederzissen (DE)

( * ) Notice: Subject to any disclaimer, the term of this patent is extended or adjusted under 35 U.S.C. 154(b) by 0 days.

(21) Appl. No.: 09/857,831

(22) PCT Filed: Oct. 21, 1999

(86) PCT No.: PCT/EP99/08003

§ 371 (c)(1), (2), (4) Date: Sep. 7, 2001

(87) PCT Pub. No.: WO00/33978

PCT Pub. Date: Jun. 15, 2000

(30) Foreign Application Priority Data

Dec. 10, 1998 (DE) ........................................ 198 57 045

(51) Int. Cl.$^7$ ............................ B05D 3/02; B05D 3/06; B29C 71/04

(52) U.S. Cl. ....................... 427/542; 427/521; 427/512; 118/642

(58) Field of Search ................................ 427/512, 514, 427/521, 542, 522; 118/642, 643

(56) References Cited

U.S. PATENT DOCUMENTS

| | | | | | |
|---|---|---|---|---|---|
| 3,554,502 | A | * | 1/1971 | Rye et al. | 427/542 |
| 3,933,875 | A | * | 1/1976 | Brose et al. | 427/522 |
| 4,360,541 | A | * | 11/1982 | Costanza et al. | 427/522 |
| 4,390,564 | A | * | 6/1983 | Kimble | 427/542 |
| 4,464,220 | A | * | 8/1984 | Beer | 427/542 |
| 4,520,048 | A | * | 5/1985 | Ranger | 118/643 |
| 4,900,583 | A | * | 2/1990 | Hirabayashi et al. | 427/542 |
| 4,943,447 | A | * | 7/1990 | Nelson et al. | 427/542 |
| 5,032,424 | A | * | 7/1991 | Carlson et al. | 427/542 |
| 5,323,485 | A | * | 6/1994 | Josefsson et al. | 427/542 |
| 5,498,761 | A | * | 3/1996 | Wessling et al. | 427/542 |
| 6,200,646 | B1 | * | 3/2001 | Neckers et al. | 427/512 |
| 6,406,757 | B1 | * | 6/2002 | Blatter et al. | 427/517 |
| 6,432,491 | B1 | * | 8/2002 | Blatter et al. | 427/514 |
| 6,436,485 | B1 | * | 8/2002 | Sedlmeyr | 427/521 |
| 6,471,819 | B1 | * | 10/2002 | Bär et al. | 427/542 |
| 6,506,458 | B1 | * | 1/2003 | Blatter et al. | 427/493 |
| 6,531,189 | B1 | * | 3/2003 | Blatter et al. | 427/514 |
| 2003/0100667 | A1 | * | 5/2003 | Bendix et al. | 427/517 |
| 2004/0018318 | A1 | * | 1/2004 | Weikard et al. | 427/508 |
| 2004/0077750 | A1 | * | 4/2004 | Sapper | 427/508 |

FOREIGN PATENT DOCUMENTS

| | | | | |
|---|---|---|---|---|
| DE | 20 29 657 | A | | 12/1971 |
| GB | 1309626 | | * | 3/1973 |
| WO | WO 99/41323 | | * | 8/1999 |

* cited by examiner

*Primary Examiner*—Marianne Padgett
(74) *Attorney, Agent, or Firm*—Marshall, Gerstein & Borun LLP

(57) ABSTRACT

The invention relates to a method of drying coated and/or impregnated objects (5), in particular lacquered wood, wherein [drying of] a coating agent and/or impregnation agent applied to the surface of the object concerned is completed before a characteristic period of time has elapsed, by irradiating the coated or impregnated surface with infrared radiation. The characteristic period of time is determined by the time needed for components of the coating and/or impregnation agent (22) to migrate away, i.e. by penetrating into the object (5), so that the quality of the coating or impregnation is impaired. Alternatively or in addition, the characteristic period of time is determined by the fact that after it has elapsed, a solvent and/or dilution fluid that is contained in the coating and/or impregnation agent (22) and is to be driven out and/or bound during the heating process has caused fibers in the object (5) to be raised up, so that a secondary treatment of the surface is necessary or desirable.

19 Claims, 1 Drawing Sheet

COATING AND DRYING OF OBJECTS BY WAY OF INFRARED RADIATION

Figure 1:
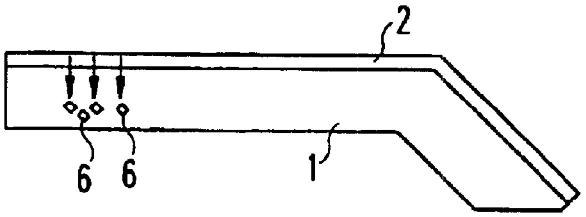

The invention relates to a method of drying coated and/or impregnated objects, in particular lacquered wood, in cases such that a coating and/or impregnation agent that has been applied to the object concerned contains a solvent or dilution fluid, in particular water, that is to be driven out during the drying, and such that the solvent or diluting fluid has the property of penetrating into the object while in the undried state, so that uniformly structured regions, in particular fibres of the object, change their position in the object and after a characteristic period of time following application of the impregnation or coating agent change the surface structure in such a way that subsequent treatment of the surface (polishing, coating or impregnating) is necessary or desirable. The invention further relates to a method of drying a coated and/or impregnated object, in particular lacquered wood, in cases such that a coating and/or impregnation agent that has been applied to the object concerned comprises a component, in particular colouring pigments, having the property that because of its presence in the region of the surface and/or in the coating the quality of the coating or impregnation is insured, but also having the property that in the undried state it penetrates into the object and after a characteristic period of time following application of the impregnation or coating agent it is no longer present in sufficient quantity in the region of the surface and/or in the coating, so that a subsequent treatment of the surface, in particular a secondary lacquering, is necessary or desirable. Finally the invention relates to the employment of a means of drying coated and/or impregnated objects.

When water-based lacquers are used, the problem arises that in the region of an initially smooth wooden surface the penetration of water causes certain regions or fibres in the wood, which in themselves are uniformly structured, to rise up because the entering water makes the uniformly structured regions swell and/or forces them apart. After drying of the lacquer, or of the lacquer and the wooden object, it is therefore customary to polish the lacquered surface and apply another lacquer coating. In this case the coating first applied functions as a water barrier, because it prevents water from penetrating into the wood.

The same or at least similar effects appear in other absorbent materials that comprise a plurality of regions and/or fibres that are in themselves uniformly structured. The effects are also produced not only by water-based lacquers but in general by coating agents and/or impregnation agents that are water-based or can be diluted by water, for instance scumbles, mordants, flame-retardant coatings and/or other protective and impregnation agents that are applied to the surface of the object to be treated. Furthermore, the effects are produced not only by coating and/or impregnation agents that contain water, but also by agents containing other solvents and/or dilution fluids that are to be driven out and/or bound during drying.

When pigmented lacquers are used and the objects to be coated are made of wood or similarly absorbent materials, it can also happen that after a characteristic period of time the pigments appear to fade, because they have migrated into the interior of the object. In order to produce the intended visual effect, the pigments should remain near the surface of the object and/or within the applied layer, but in this case they penetrate the object and the desired effect is lost. That is, the coating and/or impregnation is not of the required or desired quality. In this situation, again, further treatment is necessary or at least desirable, in particular a secondary lacquering.

Not only pigments but also other components of coating and/or impregnation agents, which are crucial for the quality of the coating or impregnation, can become less effective as a result of inward migration when applied to the surface of an object that absorbs or allows penetration of such materials.

Drying of the coated and/or impregnated objects can be brought about passively by waiting until the moist component has become distributed through the surroundings of the object, and/or over the object and into its surroundings, as a result of a concentration gradient. Especially in industrial production lines, however, drying is actively induced by passing the objects to be dried through an oven, for example, or irradiating them with infrared radiation. Another known procedure is to use UV radiation in order to harden, in particular, water-based coating and/or impregnation agents. Here the solvent, in this case water, is permanently bound to the coating and/or impregnation agent by the hardening process. The term "drying" is understood to include this binding of the moist components so that they can no longer become separated from the agent.

Water is known to be a preferred solvent and/or dilution fluid, because it is environmentally compatible. In particular, for the drying process open systems can be used that discharge the expelled water into the surroundings, in some circumstances after it has passed through a filter.

An objective of the present invention is to disclose a method of the kind cited at the outset, for drying coated and/or impregnated objects, the use of which eliminates the need for subsequent treatment of the coated and/or impregnated surface. Another objective of the invention is to disclose how a means of drying coated and/or impregnated objects can be employed in such a way as to make it unnecessary for such objects to be given secondary treatment after they have been dried.

Regarding the method, drying is completed before the characteristic time period has elapsed, at the end of which the position of the fibres, or more generally the individually uniformly structured regions, would have changed so greatly that a subsequent treatment of the surface would be necessary or desirable, or at the end of which the component crucial for the quality of the coating or impregnation would have migrated into the substrate to a sufficient extent that a subsequent treatment of the surface would be necessary or desirable.

Preferably the infrared radiation used for this purpose comprises substantial components, which bring about the drying, in the near infrared and in particular is at wavelengths below 1.0 $\mu$m. The term "near infrared" is understood to mean the wavelength range between the visible region and 1.4 $\mu$m. It is advantageous that only a small amount of energy is contributed to the near infrared by thermal radiation from objects at room temperature. Electromagnetic radiation in the near infrared can thus easily be distinguished from the thermal radiation of nearby objects at room temperature, which are unavoidably present in most situations. Therefore near-infrared radiation can be especially well controlled.

Furthermore, water has an especially high absorptance for near-infrared radiation, so that water molecules can be specifically excited and expelled from the not yet dried coating or impregnation agent. This has the advantage that the remaining structure—other components of the coating or impregnation agent and in particular the object to the surface of which these have been applied—is heated negligibly or not at all. A subsequent cooling or waiting time can thus be eliminated. Further processing or storage, which for example can involve stacking the objects, can be done immediately after the drying process, with no interruption.

In a further development the infrared radiation is adjusted and/or filtered before it is incident on the surface, in such a way as to exclude spectral components of the radiation that would cause an undesired heating of the coating or impregnation agent and/or of the object. For this filtering optical filters known from the state of the art or familiar to the expert can be used, in particular transparent filters. Such means can also be used to achieve a targeted excitation of solvents or dilution fluids other than water.

In a further development the infrared radiation has a spectral peak of radiation flux density in the near infrared, in particular at wavelengths below 1.0 $\mu$m. Preferably the infrared radiation is emitted as thermal radiation from a radiation emitter heated to temperatures of 2500 K or higher, in particular 2900 K or higher. This procedure has several advantages. Firstly, because of the large difference in temperature between the radiation emitter and the surroundings, which are ordinarily at or approximately at room temperature, the radiation emitter cools down rapidly when the heating is turned off. In addition the emitted radiation density, i.e. the radiant energy sent out from the surface of the emitter, is larger at high temperatures than at lower temperatures. Hence the volume of the radiation emitter can be made correspondingly small, so that its overall heat capacity is low. The resulting radiation emitter can be excellently well controlled at the high temperatures mentioned above. Preferably the heating is achieved electrically in the known manner, by causing an electrical current to flow through a radiation emitter constructed as an electric resistor. Electric currents can be inexpensively controlled by known means.

In particular in the case of wood coated with water-based lacquer, it has been found that wood fibres typically begin to rise up after 5 seconds. If the water-based lacquer contains pigments, a fading of the pigment by migration sufficient to have a negative influence on the quality of the lacquer is typically observable after 3 seconds. It is therefore preferable for the drying to be completed within 5 seconds, in particular within 3 seconds after the impregnation or coating agent has been applied.

In the case of industrial coating or impregnation of objects, the latter are customarily conveyed continuously in a particular transport direction. In accordance with the invention the object concerned preferably passes through an application zone, in which the coating and/or impregnation agent is applied, and then is conveyed further such that the object, or the part of its longitudinal extent that has been coated/impregnated, enters a drying zone in which the coated/impregnated surface is irradiated with infrared radiation. The coating and/or impregnation agent can be applied all around the object or only to certain parts of its surface. Accordingly, the infrared radiation with radiant energy approximately uniformly distributed over the coated or impregnated surface is preferably incident simultaneously over the entire coated or impregnated surface of a longitudinal section of the object. Preferably a plurality of radiation sources are used for this purpose, and/or the radiation is appropriately diverted by scattering and/or reflection.

So that the drying process can be stopped as soon as possible after application, a design is preferred in which the object, more specifically its longitudinal sections enter the drying zone immediately after leaving the application zone or even when they have only partially passed through the application zone. Apparatus is already known for applying liquid or pasty coatings and/or impregnation agents in which the agent is transported within the application zone by a stream of gas, which carries the agent from the reservoir where it is stored and deposits it on the surface of the object. For example, the coating systems in the "VACUMAT" series produced by the Schiele Maschinenbau GmbH, Kapellenstr. 7, D-56651 Niederzissen function according to this principle. In a further development of the invention, the gas stream is preferably used to cool one or more sources of infrared radiation before it reaches the reservoir, and/or to cool other components involved in irradiation within the drying zone, such as reflectors, radiation filters and/or partitions that are transparent to the radiation. In the case of coating agents and/or impregnation agents the viscosity of which is improved by warming, the heat acquired by the gas during the cooling process is particularly advantageous. This heat, alone or in combination with additional heating, raises the temperature of the coating and/or impregnation agent as desired.

The means proposed for use as a drying means in accordance with the invention is an infrared lamp designed for drying an object coated or impregnated with a coating and/or impregnation agent. Preferably the infrared lamp is a halogen lamp.

In a further development the infrared lamp is constructed as a tubular radiator with an incandescent filament that extends linearly within a tube that is transparent to radiation, in particular a quartz-glass tube.

In another further development the infrared lamp is combined with a reflector element that extends along the tube and has a groove-like cross section, enclosing the tube at the back in such a way that the infrared radiation is intensified by the addition of reflected radiation to the radiation emitted towards the front side.

In the following the invention is explained in greater detail with reference to exemplary embodiments and to the attached drawing. However, the invention is not restricted to these exemplary embodiments. The individual figures in the drawing are as follows.

Figure 2:
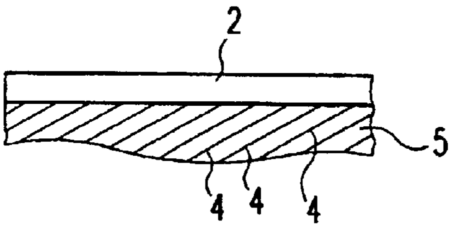
Figure 3:
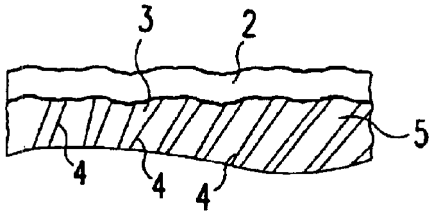
Figure 4:
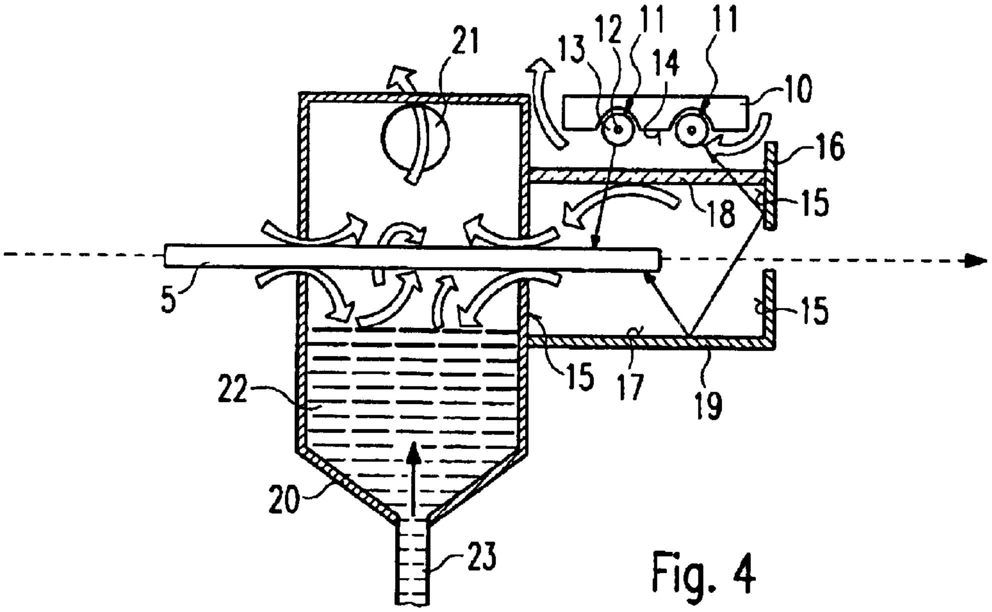

FIG. 1 shows a profiled piece coated on two sides, in which pigments are migrating to the interior before the drying has ended, FIG. 2 shows a freshly lacquered wooden surface, FIG. 3 shows the wooden surface according to FIG. 2 after the wood fibres have become raised, FIG. 4 shows an apparatus for coating and drying objects.

FIG. 1 shows a profiled piece 1 made of moderately dense fibrous material (MDF). The MDF profile 1 is freshly coated with a layer 2 of water-based lacquer. However, the lacquer layer 2 has already been on the MDF profile 1 long enough for the colouring pigments 6 that had been contained in the layer 2 to have migrated out. This migration is indicated by three arrows in the left half of the picture. The situation represented in FIG. 1 corresponds to a time ca. 3 seconds after the beginning of the application process in which the lacquer layer 2 is put onto the object.

In accordance with the invention the situation represented in FIG. 1 is prevented from occurring because the drying is completed in less than 3 seconds, in particular within one second after the beginning of the application process.

FIG. 2 shows a coated surface of part of a wooden profile 5 in cross section. The coating consists of a layer 2 of water-based lacquer. The wooden profile 5 comprises fibres 4 that end at the surface of the profile 5. The surface was polished before coating and is correspondingly smooth.

FIG. 3 shows the wooden profile 5 according to FIG. 2 at a later time. Because the drying of the water-based lacquer layer 2, or of the layer 2 and the profile 5, was not completed in time, since the object was in the state shown in FIG. 2 water has penetrated into the fibres 4 and into spaces 3 between the fibres 4, as a result of which the fibres 4 have become raised up and both the surface of the profile 5 that bears the lacquer layer and the outer surface of the layer 2 itself have become rough and uneven. The purchasers of industrially manufactured products, in particular, will not accept such a surface structure. Therefore a secondary treatment is required, usually smoothing of the dried outer surface of the lacquer followed by application of another coat of lacquer.

In order to keep the wooden profile 5 permanently in the state shown in FIG. 2, which represents an arbitrary point in time less than 5 seconds after application of the layer 2 of water-based lacquer was begun, in accordance with the invention the drying is completed before the 5 seconds have elapsed, in particular within 1 second after the beginning of the application process.

FIG. 4 shows a cross section of an apparatus for the lacquering of wooden piece goods. As represented in FIG. 4 the piece of wood is being conveyed from left to right, by means of conveyor mechanisms familiar to one skilled in the art. In this process high operating speeds, i.e. transport speeds, are desirable, in particular transport speeds of 8–80 m/min or even, when special feed aggregates are employed, transport speeds of up to 240 m/min. Such special aggregates are driven, for example, by two synchronously controlled motors and take up relatively little space.

The wooden piece goods are exemplified in FIG. 4 specifically by a wooden profile 5, a section of which was shown in FIG. 2. The profile is about 2 m long and is being transported at a velocity of 1 m/s, or 60 m/min. Coming from the left, it first passes through an application chamber 20, the dimensions of which in the transport or longitudinal direction define an application zone. Immediately thereafter, i.e. at no spatial distance from the application chamber 20, is disposed the drying zone of the apparatus, which is defined by a longitudinal section of the transport path that can be exposed to infrared radiation. For this purpose the apparatus comprises two halogen lamps 11 that extend perpendicular to the plane of the drawing in FIG. 4. The halogen lamps 11 are constructed as tubular radiators. Each comprises a quartz-glass tube 13 and a tungsten wire 12 disposed approximately in the central line of the associated quartz-glass tube. The tungsten wire 12 serves as radiation emitter. During the period of irradiation an electrical current flows through the tungsten wire 12, so that it is at a temperature of about 3200 K.

The radiation emitted by the halogen lamps 11 either travels directly towards the piece of wood to be dried or reaches it indirectly. There may be several different indirect paths.

The halogen lamps 11 are combined with a lamp reflector element 10 comprising two groove-like recesses that extend along the quartz-glass tubes 13 and in cross section are partially occupied by the halogen lamps 11. The surface of the underside of the lamp reflector element 10, including the surface of the groove-like recesses, is such as to reflect infrared radiation. For example, the lamp reflector element 10 is made of aluminium and the reflecting surface of the lamp reflector element 10, called the upper reflector surface 14 of the apparatus, is formed by polishing the aluminium.

In order to ensure effective infrared irradiation, on the right-hand side of the drying zone a side reflector element 16 is disposed, the inner surface of which, facing the drying zone, is a lateral reflector surface 15 designed to reflect infrared radiation. A bottom reflector element 19 is also provided in the lower region of the drying zone, with lower 17 and lateral 15 reflector surfaces facing inwards towards the drying zone. Finally, the external surface of the part of the application chamber 20 that faces towards the drying zone is constructed as a lateral reflector surface 15. Because the apparatus is shown in section in FIG. 4, additional reflector surfaces above and below the plane of FIG. 4 are not visible; these complete the structure enclosing the drying zone, forming an almost completely closed space around the drying zone within which the infrared radiation is approximately homogeneously distributed by reflections. Thus all sides of the wooden profile 5 are irradiated with approximately equal radiation flux density as the profile is transported through the drying zone.

Openings are disposed at several places in the wall around the drying zone: where the piece of wood enters the drying zone from the left, where it leaves on the right, and at the sides of the top, on the right and left of the lamp reflector element 10. These last openings serve to allow air to be blown along the lower surface of the lamp reflector element 10, in order to cool the halogen lamps 11 and the lamp reflector element 10. The cooling minimizes an undesired thermal radiation, which would be difficult to control, from the components of the apparatus other than the tungsten wires 12 that participate in the irradiation. These are in particular the quartz-glass tubes 13, the lamp reflector element 10, the side reflector element 16, the other side reflector elements (not visible in the figure), the bottom reflector element 19 and a glass partition 18 that subdivides the drying zone into a lower and an upper compartment. Cooling occurs separately in the upper and also in the lower compartment.

Like the cooling in the upper compartment, that in the lower compartment is brought about by forced convection of air. The forced convection is driven by a pump (not shown) that sucks air in from the right, through the opening provided for the piece of wood to leave the drying zone, and draws the air into into the lower compartment of the drying zone. There the air current first splits up so as to cool both the undersurface of the glass partition 18 and the reflector surfaces in the lower compartment. Then the air flows into the application chamber 20, through the opening on its right side, and there whirls up the liquid lacquer so as to form a homogenous mist of lacquer, which becomes deposited on the wooden profile 5. Next to the right-hand opening of the application chamber 20 the air flows closely along the coated surface of the wooden profile 5. Accordingly, the opening is dimensioned such that all the way around the wooden profile 5 there are only a few millimeters of clearance from the edge of the opening. At the left opening of the application chamber 20, through which the wooden profile 5 is conveyed into the application chamber 20, air also enters the application chamber 20. Here the space between the wooden profile 5 and the edge of the opening is smaller, so as to ensure that most of the air entering the application chamber flows through the right-hand opening. Through an outlet 21 of the application chamber 20 the lacquer mist leaves the application chamber 20. By means of components of the apparatus not shown here the lacquer components of the lacquer mist are separated out, cleaned and returned to the reservoir of liquid lacquer 22 in the application chamber 20 by way of the inlet pipe 23.

Because the time taken for each individual longitudinal section of the wooden profile 5 to pass through the drying zone is about one second, and because drying has been completed when the profile leaves the drying zone, none of the colouring pigment migrates inward from the lacquered surface of the wooden profile 5, and the water and/or other solvents or dilution fluids contained in the liquid lacquer have no time to penetrate the wooden profile 5 sufficiently to cause its fibres to be raised up. To ensure complete drying, the halogen lamps 11 must emit sufficient radiation; therefore the radiation output is adjusted according to the area of surface to be dried per longitudinal section of the wood, in dependence on the transport speed. If the maximal radiation output does not suffice, additional halogen lamps (not shown) are switched on.

The glass partition 18, which subdivides the drying zone, enables the flow of cooling air in the upper and the lower compartment to be independently matched to the local requirements. On the other hand, it uncouples the airstream needed for lacquering in the application chamber 20 from the temperature, and hence from the cooling requirements, of the halogen lamps 11 and the lamp reflector element 10. In alternative exemplary embodiments it can be desirable to heat the air that flows into the application chamber 20 through its right-hand opening to higher temperatures (for example, in order to warm the lacquer). In this case, alternatively or in addition a current of air flowing along the halogen lamps is directed into the application chamber.

List of Reference Numerals

| | |
|---|---|
| 1 | MDF profile |
| 2 | Layer of water-based lacquer |
| 3 | Space between fibres |
| 4 | Fibre |
| 5 | Wooden profile |
| 6 | Colouring pigment |
| 10 | Lamp reflector element |
| 11 | Halogen lamp |
| 12 | Tungsten wire |
| 13 | Quartz-glass tube |
| 14 | Upper reflector surface |
| 15 | Lateral reflector surface |
| 16 | Side reflector elements |
| 17 | Lower reflector surface |
| 18 | Glass partition |
| 19 | Bottom reflector element |
| 20 | Application chamber |
| 21 | Outlet |
| 22 | Liquid lacquer |
| 23 | Inlet pipe for lacquer |

What is claimed is:

1. Method of drying lacquered wood, in cases such that a lacquer applied to a surface of a wooden object contains a solvent or dilution fluid that is to be driven out or bound during drying, and such that the solvent or dilution fluid has the property of penetrating into the wooden object in the undried state with the result that uniformly structured regions change their position in the wooden object and, after a characteristic period of time following application of the lacquer, alter the surface structure in such a way as to make secondary treatment of the surface necessary or desirable, comprising:

completing the drying before the characteristic period of time has elapsed by irradiating the surface of the wooden object with infrared radiation.

2. Method according to claim 1, characterized in that the infrared radiation comprises substantial components in the near infrared, which bring about the drying.

3. Method according to claim 2, characterized in that the infrared radiation has a spectral radiation flux density maximum in the near infrared.

4. Method according to claim 3, characterized in that the infrared radiation is emitted as thermal radiation from a radiation emitter that is heated to temperatures of 2500 K or higher.

5. Method according to claim 2, characterized in that the infrared radiation has a spectral radiation flux density maximum at a wavelength below 1.0 μm.

6. Method according to claim 3, characterized in that the infrared radiation is emitted as thermal radiation from a radiation emitter that is heated to temperatures of 2900 K or higher.

7. Method according to claim 1, characterized in that the drying is completed within 5 seconds after the application of the lacquer.

8. Method according to claim 1, characterized in that the wooden object being processed is conveyed continually in a longitudinal direction, in the course of which the wooden object first passes through an application zone in which the lacquer is applied to the wooden object to produce a lacquered wooden object, and that the lacquered wooden object is then conveyed into a drying zone in which the lacquered surface is irradiated with the infrared radiation.

9. Method according to claim 8, characterized in that the lacquered wooden object enters the drying zone immediately after leaving the application zone or after having partially passed through the application zone.

10. Method according to claim 9, wherein the application of the lacquer in the application zone is brought about by a stream of gas that carries along the lacquer, which is contained in a reservoir, and deposits the lacquer on the surface of the wooden object, characterized in that before the stream of gas reaches the reservoir, the stream of gas is used to cool an infrared radiation source and/or to cool other components involved in the irradiation in the drying zone.

11. Method according to claim 1, including providing an infrared lamp to dry the wooden object coated or impregnated with lacquer.

12. Method according to claim 11, wherein the infrared lamp is a halogen lamp.

13. Method according to claim 11, wherein the infrared lamp is constructed as a tubular radiator with an incandescent filament that extends linearly within a quartz-glass tube.

14. Method according to claim 11, wherein the infrared lamp is constructed as a tubular radiator with an incandescent filament that extends linearly within a tube that is transparent to radiation.

15. Method according to claim 14, wherein the infrared lamp is combined with a reflector element that extends along the tube and in cross section has a groove like structure enclosing a back side of the tube in such a way that the infrared radiation is intensified by addition of reflected radiation to the radiation emitted towards a front side of the tube.

16. Method according to claim 1, characterized in that the infrared radiation comprises substantial components at wavelengths below 1.0 μm, which bring about the drying.

17. Method according to claim 1, characterized in that the drying is completed within 3 seconds after the application of the lacquer.

18. Method of drying a lacquered wooden object in cases such that a lacquer applied to a surface of the wooden object includes a component, with the properties that the presence of the component in a region of the surface or in the lacquer ensures a desired quality of the coating, however in the undried condition the component penetrates into the wooden object and after a characteristic period of time following application of the lacquer, the component is no longer present in sufficient quantity in the region of the surface or in the lacquer so that a secondary lacquering is necessary or desirable, comprising:

completing the drying before the characteristic period of time has elapsed by irradiating the surface of the wooden object with infrared radiation.

19. Apparatus for lacquering a wooden object comprising:

an application chamber for continuously applying a lacquer to the wooden object, and a transport mechanism for continuously transporting the wooden object from the application chamber to an irradiation device for drying the lacquer, wherein the transport mechanism is so constructed that the speed of the transport mechanism is adjustable in such a way that the wooden object can be conveyed from the application chamber into the irradiation device and thereby dried within less than 5 seconds.

* * * * *

UNITED STATES PATENT AND TRADEMARK OFFICE
CERTIFICATE OF CORRECTION

PATENT NO. : 6,858,261 B1
DATED : February 22, 2005
INVENTOR(S) : Kai K.O. Bär et al.

It is certified that error appears in the above-identified patent and that said Letters Patent is hereby corrected as shown below:

Title page,
Item [73], Assignee, delete "Bruckmuhl-Heufeld" and insert -- Bruckmühl-Heufeld --; and delete "oHG" and insert -- OHG --.

Column 8,
Line 33, delete "and/or" and insert -- or --.
Line 49, delete "groove like" and insert -- grooved --.
Line 62, delete "component," and insert -- component --.

Signed and Sealed this

Eighth Day of November, 2005

JON W. DUDAS
*Director of the United States Patent and Trademark Office*